United States Patent

[11] 3,587,132

| [72] | Inventor | Jess Czetli<br>West Pikeland Township, Chester County, Pa. |
|---|---|---|
| [21] | Appl. No. | 756,798 |
| [22] | Filed | Sept. 3, 1968 |
| [45] | Patented | June 28, 1971 |
| [73] | Assignee | The Alan I W Frank Corporation, Pittsburgh, Pa. |

[54] MOLDING APPARATUS
12 Claims, 9 Drawing Figs.

[52] U.S. Cl. ................................................ 18/5
[51] Int. Cl. ........................................ B29d 27/04
[50] Field of Search ............................ 18/5 (P), 6 (I), 17 (H), 30 (HM)

[56] References Cited
UNITED STATES PATENTS

| 2,916,771 | 12/1959 | Lang et al. | 18/17X |
| 2,927,620 | 3/1960 | Elliott | 18/17X |
| 3,141,192 | 7/1964 | Benedetto | 18/5 |
| 3,224,037 | 12/1965 | Robbins et al. | 18/5 |
| 3,384,159 | 5/1968 | Czetli | 18/5 |

Primary Examiner—H. A. Kilby, Jr.
Attorney—Edward Hoopes, III

ABSTRACT: Molding apparatus for forming an article out of material subjected successively to different temperatures comprising a mold in which the material is formed, the mold being constituted of heat-conducting material, and means forming cooperatively with the mold a passage through which media of different temperatures are adapted successively to pass in contact with the mold so that the material in the mold is subjected successively to the temperatures of said media through the heat-conducting material of the mold, said means being of non-heat-conducting material whereby to minimize heat transfer therethrough in either direction. The mold preferably has male and female mold parts adapted for separation to permit removal of the formed article and said means preferably form cooperatively with either one or both of the mold parts a passage or passages through which said media are adapted successively to pass in contact with such mold part or parts.

Also molding apparatus for forming an article out of material subjected successively to different temperatures comprising opposed platens comprising non-heat-conducting material, means for relatively moving the platens toward and away from each other, the platens having respectively male and female portions arranged so that the male portion enters the female portion when the platens move relatively toward each other, and a male mold part of heat-conducting material disposed over the male platen portion and a female mold part of heat-conducting material disposed within the female platen portion so that when the platens move relatively toward each other the male and female mold parts form a mold for forming an article out of said material disposed in the mold with passages for said media between the made mold part and the male platen portion and between the female mold part and the female platen portion, heat transfer through the male and female platen portions being minimized due to the platens comprising non-heat-conducting material. Guide means are preferably provided for relatively guiding the platens in their relative movement toward and away from each other with platen-carried means cooperating with the guide means for precision guiding of the relative movement of the platens. Guide means may be provided in fixed relationship with one of the platens and the other platen may carry means cooperating with the guide means for precision guiding of the relative movement of the platens. Desirably the second mentioned platen carries metal means cooperating with the guide means for precision guiding of the relative movement of the platens. The guide means may be rods and the platen-carried means may be bushings guidingly receiving the rods. The platens are desirably sheathed with strong noncorrosive wear-resistant material which may be stainless steel. Self-aligning means are preferably provided insuring mating of the platens in proper cooperative relationship. Such means may comprise a yoke pivoted to the means for relatively moving the platens and connected with one of the platens.

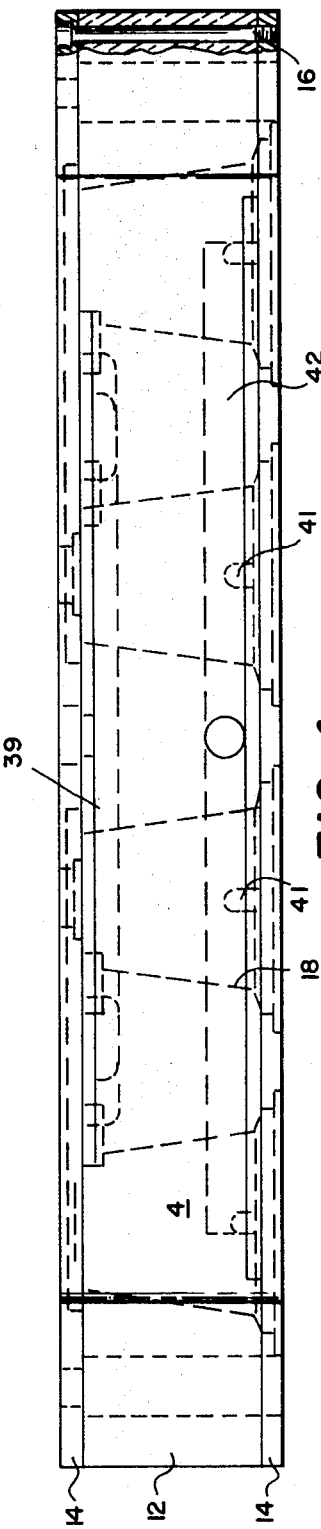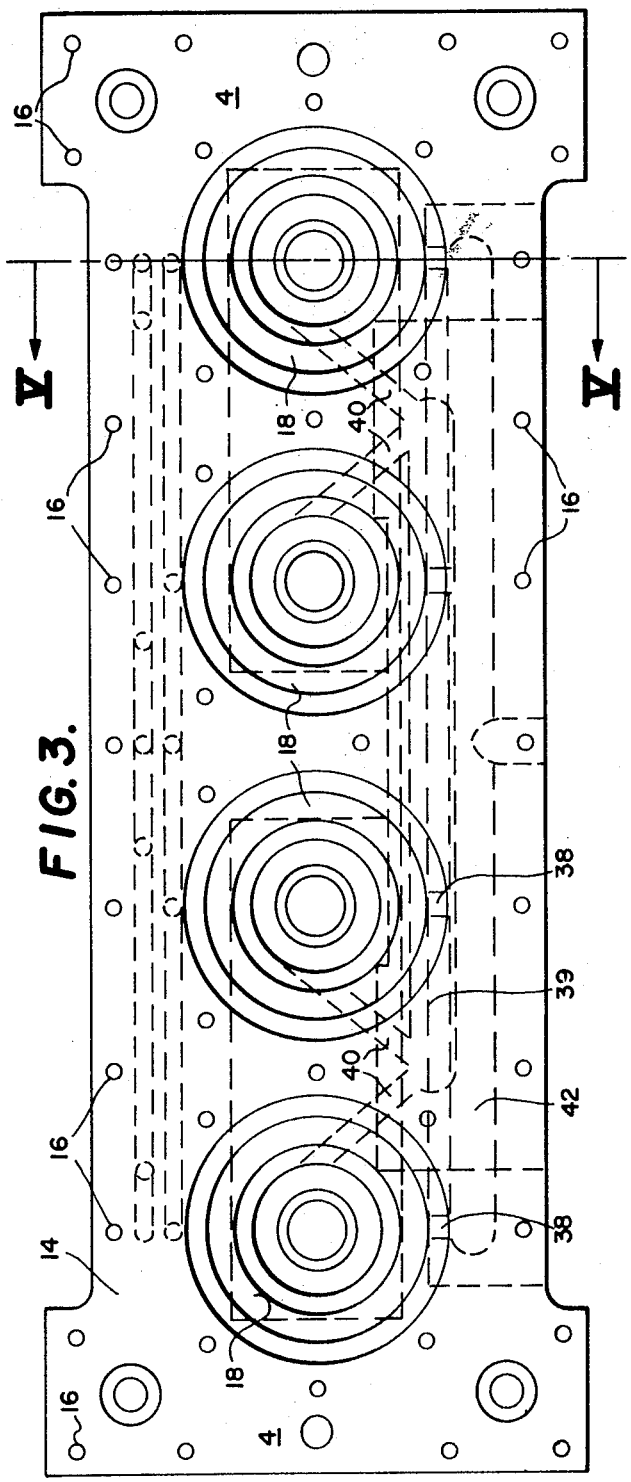

MOLDING APPARATUS

This invention relates to molding apparatus for forming an article out of material subjected successively to different temperatures, i.e., to temperature cycling. The invention provides means for greatly increasing the thermal efficiency of the forming procedure and as a consequence reducing the cycle time and increasing the output of the apparatus. In other aspects of the invention the apparatus provides for optimum precision in forming the article.

While my invention has wide application in the field of forming articles out of material subjected successively to different temperatures, for purposes of explanation and illustration I shall describe the invention as embodied in apparatus for the formation of containers or cups out of expandable fusible plastic material such, for example, as polystyrene beads containing an expanding or so-called "foaming" agent. Such beads are introduced into a mold wherein they are subjected first to a medium of relatively high temperature to expand the beads and then to a medium of relatively low temperature to set the expanded beads in the form of a container or cup having the shape of the mold cavity. This is a technique known to those skilled in the art. The medium of relatively high temperature may, for example, be steam and the medium of relatively low temperature may, for example, be water, although other media performing the same functions may be employed.

Since the material used for formation of the cup or other article must in the forming process be subjected successively to the temperatures of media of relatively high temperature and relatively low temperature a problem in heat transfer is encountered which is difficult of satisfactory solution. Heretofore the apparatus has been made of metal which is a high heat conductor. Much of the heat of the medium of relatively high temperature has been dissipated by conduction through the apparatus in a direction away from the material being formed. Similarly much of the cooling effect of the material of relatively low temperature has been dissipated through the apparatus in a direction away from the material being formed. This problem has long existed and those skilled in the art have been endeavoring to solve it. One solution is disclosed in my U.S. Pat. No. 3,384,159 involving the use of a selector/directional check valve with connections to the sources of the media disposed immediately adjacent the mold casing. However that did not eliminate heat transfer in a direction away from the material being formed through the molding apparatus itself.

My improved molding apparatus greatly reduces thermal loss through the apparatus in a direction away from the material being formed by employment in a novel manner of non-heat-conducting material. I provide molding apparatus for forming an article out of material subjected successively to different temperatures comprising a mold in which the material is formed, the mold being constituted of heat-conducting material, and means forming cooperatively with the mold a passage through which media of different temperatures are adapted successively to pass in contact with the mold so that the material in the mold is subjected successively to the temperatures of said media through the heat-conducting material of the mold, said means being of non-heat-conducting material whereby to minimize heat transfer therethrough in either direction. The mold preferably has male and female mold parts adapted for separation to permit removal of the formed article and said means preferably form cooperatively with either one or both of the mold parts a passage or passages through which said media are adapted successively to pass in contact with such mold part or parts.

I also provide molding apparatus for forming an article out of material subjected successively to different temperatures comprising opposed platens comprising non-heat-conducting material, means for relatively moving the platens toward and away from each other, the platens having respectively male and female portions arranged so that the male portion enters the female portion when the platens move relatively toward each other, and a male mold part of heat-conducting material disposed over the male platen portion and a female mold part of heat-conducting material disposed within the female platen portion so that when the platens move relatively toward each other the male and female mold parts form a mold for forming an article out of said material disposed in the mold with passages for said media between the male mold part and the male platen portion and between the female mold part and the female platen portion, heat transfer through the male and female platen portions being minimized due to the platens comprising non-heat-conducting material. Guide means are preferably provided for relatively guiding the platens in their relative movement toward and away from each other with platen-carried means cooperating with the guide means for precision guiding of the relative movement of the platens. Guide means may be provided in fixed relationship with one of the platens and the other platen may carry means cooperating with the guide means for precision guiding of the relative movement of the platens. Desirably the second mentioned platen carries metal means cooperating with the guide means for precision guiding of the relative movement of the platens. The guide means may be rods and the platen-carried means may be bushings guidingly receiving the rods. The platens are desirably sheathed with strong noncorrosive wear-resistant material which may be stainless steel. Self-aligning means are preferably provided insuring mating of the platens in proper cooperative relationship. Such means may comprise a yoke pivoted to the means for relatively moving the platens and connected with one of the platens.

Other details, objects and advantages of the invention will become apparent as the following description of a present preferred embodiment thereof proceeds.

In the accompanying drawings I have shown a present preferred embodiment of the invention in which:

FIG. 3 is an inverted plan view to enlarged scale of the upper platen of the molding apparatus omitting the female mold parts of heat conducting material;

FIG. 4 is a side elevational view with a portion in vertical cross section of the upper platen as shown in FIG. 3;

Figure 1:
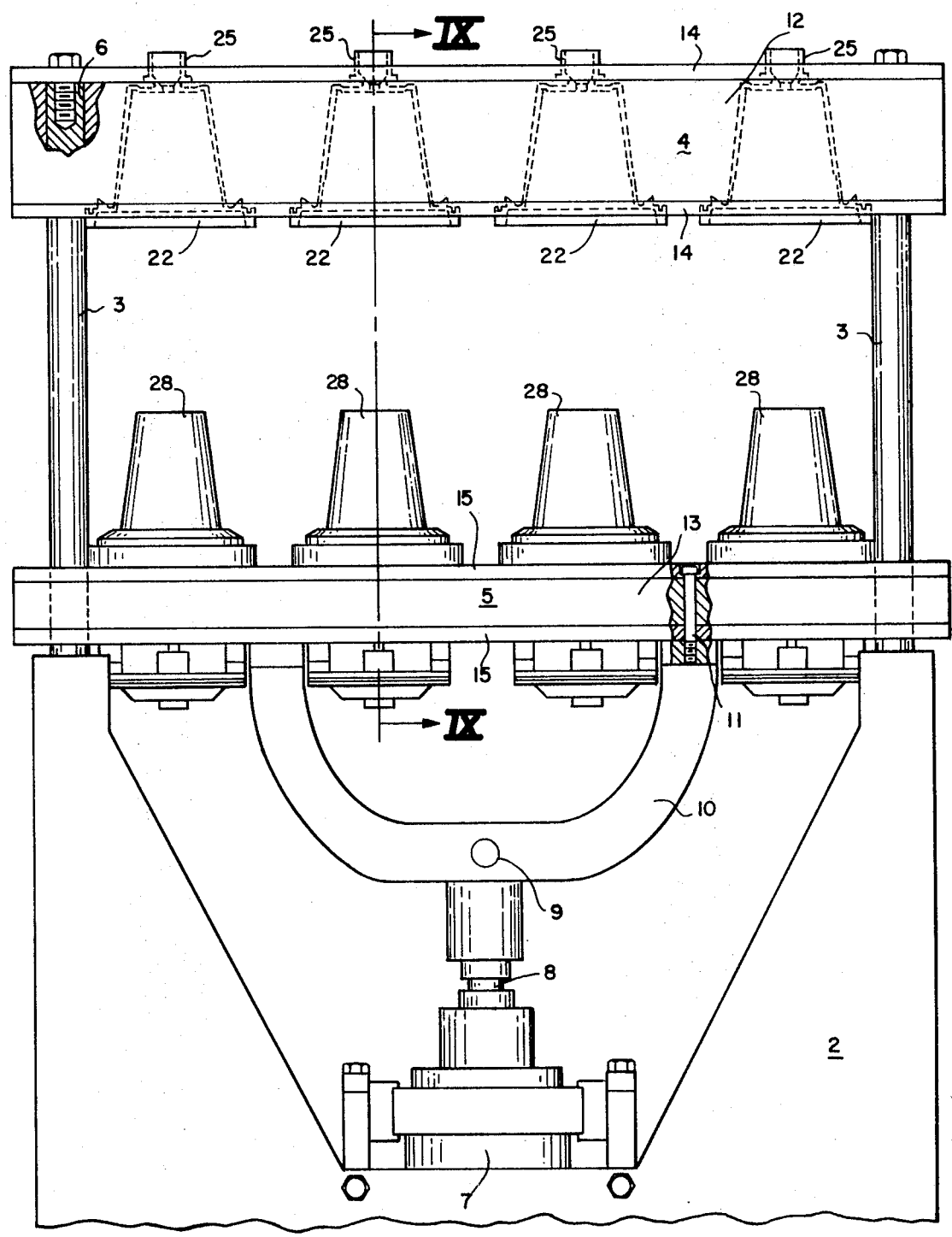
FIG. 1 is a side elevational view with portions in vertical cross section of molding apparatus in accordance with my invention, the view showing the lower platen withdrawn downwardly and spaced from the upper platen.
Figure 2:
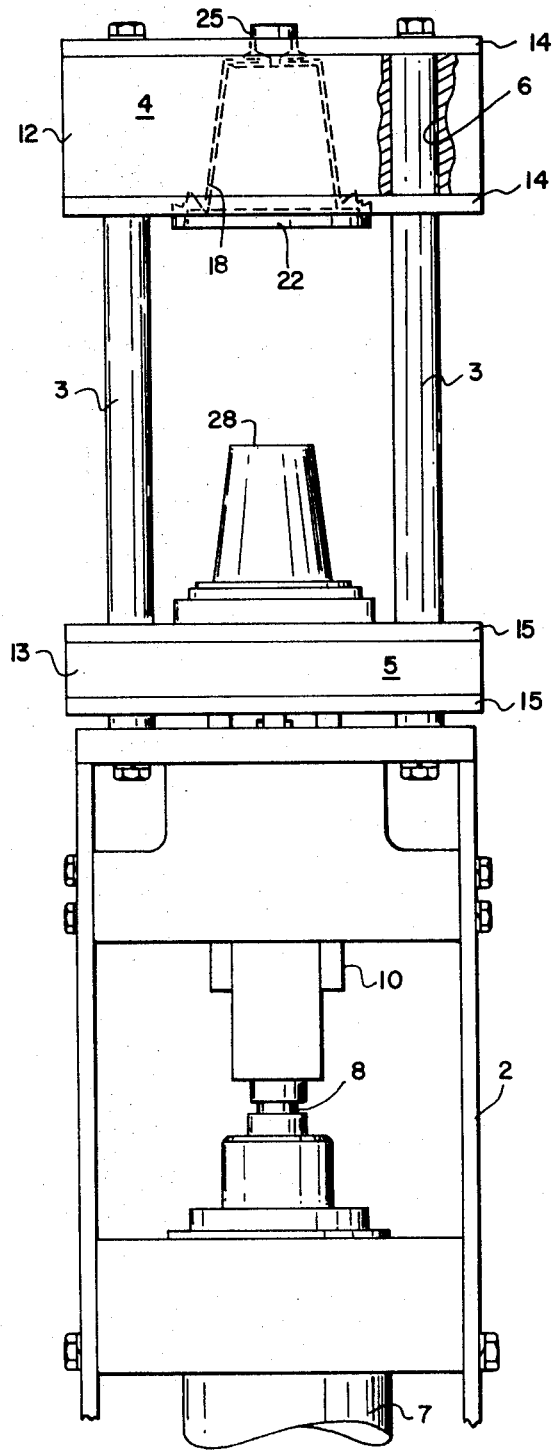
FIG. 2 is an end elevational view with a portion in vertical cross section of the molding apparatus as shown in FIG. 1.
Figure 5:
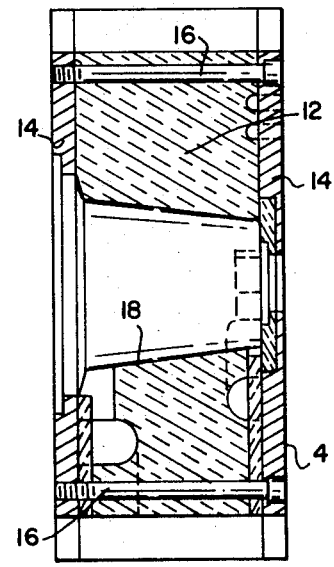
FIG. 5 is a cross-sectional view taken on the line V-V of FIG. 3.
Figure 8:
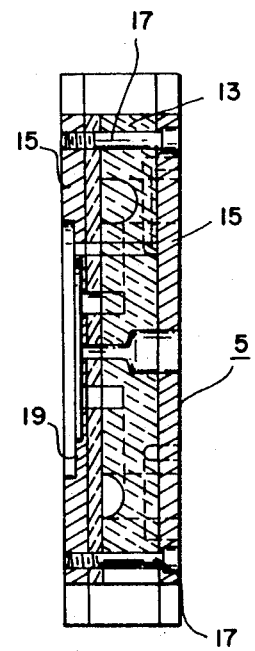
FIG. 8 is a cross-sectional view taken on the line VIII-VIII of FIG. 6.
Figure 6:
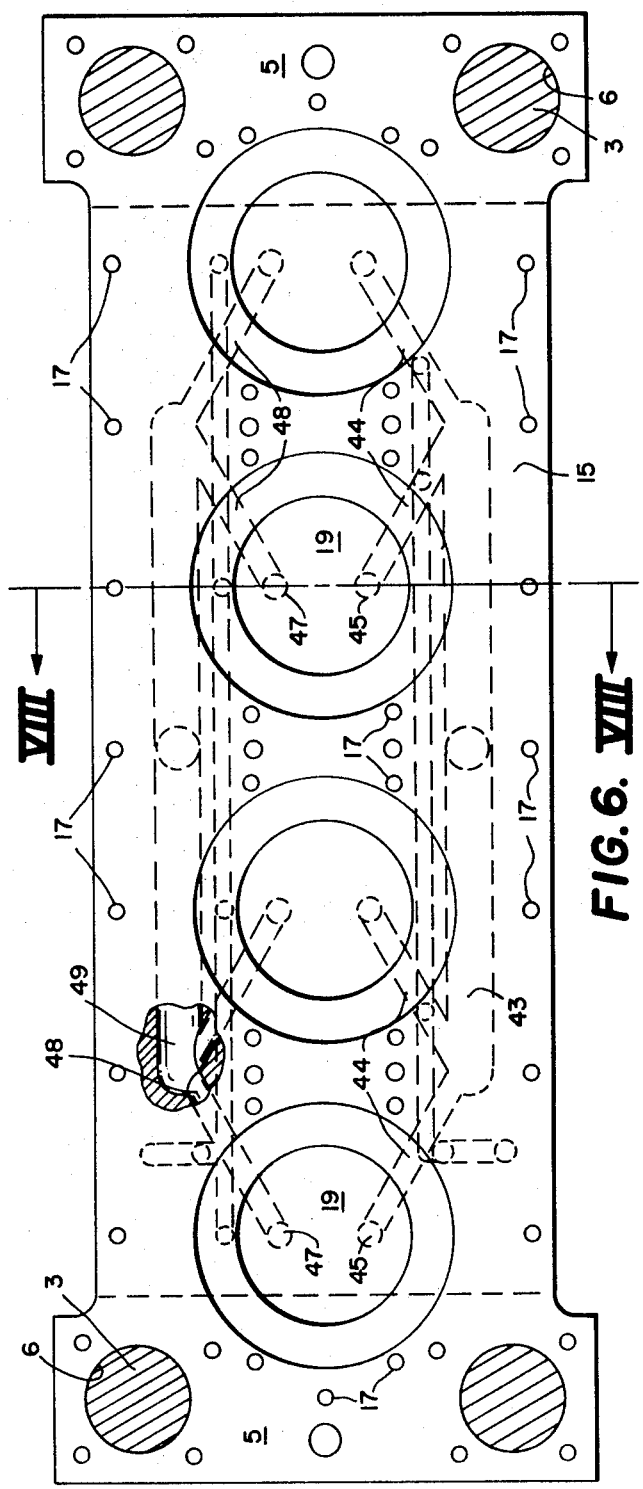
FIG. 6 is a plan view with a portion in horizontal cross section of the lower platen of the molding apparatus with the male platen portions removed and also omitting the male mold parts of heat-conducting material, the vertical guide rods for the lower platen being shown in cross section.
Figure 7:
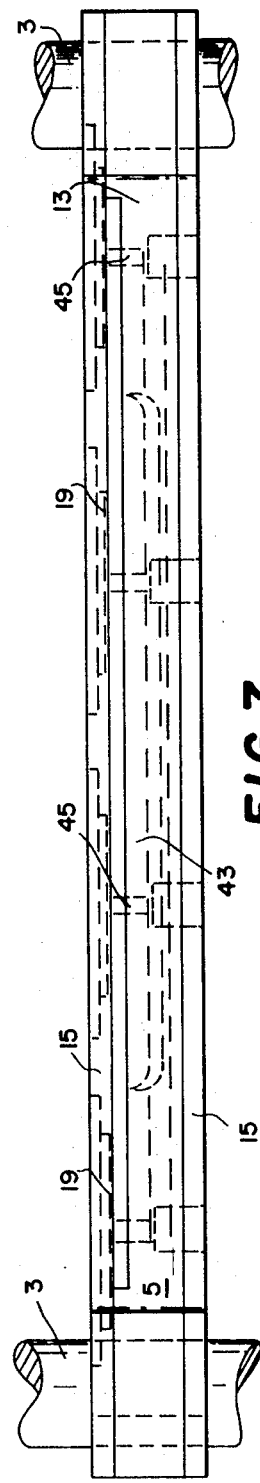
FIG. 7 is a side elevational view of the lower platen as shown in FIG. 6, the vertical guide rods for the lower platen being shown fragmentarily.

Referring now more particularly to the drawings, my molding apparatus in the form shown comprises a base 2 on which are mounted four upstanding parallel guide rods 3 arranged as at the corners of a rectangle. The upper platen is designated generally by the reference numeral 4 and the lower platen is designated generally by the reference numeral 5. The upper platen 4 is permanently mounted upon the four guide rods 3 at the upper ends thereof. The lower platen 5 has four parallel bores 6 preferably containing bushings through which the four guide rods 3 pass so that the lower platen is mounted for precision guiding by the guide rods in vertical movement to and from cooperative relationship with the stationarily mounted upper platen 4. In FIGS. 1 and 2 the lower platen is shown withdrawn downwardly and spaced from the upper platen while in FIG. 9 the lower platen is shown raised into cooperative relationship with the upper platen. When the lower platen is in its lower position spaced from the upper platen as shown in FIGS. 1 and 2 cups formed in the molds presently to be described are removed from the separated mold parts.

A cylinder 7 is mounted with its axis vertical in the base 2 centrally thereof below the lower platen. A piston operates in the cylinder and a piston rod 8 connected with the piston projects upwardly through a packing gland at the upper end of the cylinder and has pivoted thereto at 9 a yoke 10 having two arms as shown in FIG. 1 each of which is fastened to the lower platen 5 as shown at 11. Thus the lower platen is adapted to be raised by the piston in the cylinder 7 from its lowered position of FIG. 1 to its raised position of FIG. 9 in cooperative relationship with the upper platen while being guided by the rods 3, and when the lower platen comes into engagement with the upper platen the pivoted yoke acts as self-aligning means insuring mating of the platens in proper cooperative relationship.

Each of the platens 4 and 5 comprises non-heat-conducting material. Examples of materials suitable for the purpose are wood and plastic materials such as Teflon or phenolic plastic which are corrosion resistant and capable of withstanding the temperatures and temperature changes to which they are subjected in the molding operation as well as providing low thermal conductivity. The body of the platen 4 in the form shown is a block 12 of rigid phenolic plastic and the body of the platen 5 in the form shown is a block 13 of rigid phenolic plastic. The block 12 is sheathed top and bottom by plates 14 of stainless steel and the block 13 is sheathed top and bottom by plates 15 of stainless steel. Bolts 16 hold the block 12 and the plates 14 in assembled relationship to constitute the platen 4 and bolts 17 hold the block 13 and the plates 15 in assembled relationship to constitute the base portion of the platen 5 (the platen 5 in operation also includes male platen portions fastened to the base portion of the platen as will be presently explained).

The stainless steel plates 14 and 15 which constitute the sheathing of the platens reinforce the plastic bodies of the platens and are strong, noncorrosive and wear resistant, thus contributing to long life of the platens. The plates are of substantial thickness, of the order of ⅜ inch. It is stated above that the lower platen 5 has four parallel bores 6 preferably containing bushings through which the four guide rods 3 pass so that the lower platen is mounted for precision guiding by the guide rods in vertical movement to and from cooperative relationship with the stationarily mounted upper platen 4. The plates 15 of the lower platen 5 (the two plates together having an aggregate thickness of the order of ¾ inch and being spaced apart a distance equal to the thickness of the block 13) may themselves perform the function of a guide bushing so that a bushing disposed in the block 13 between the plates 15 may be dispensed with.

In the molding apparatus shown four molds are provided for molding four cups simultaneously. One of the four molds is shown in detail to enlarged scale in FIG. 9; the other three are duplicates of the one shown. The upper platen 4 has four female portions or cavities 18 tapered to larger dimension from top to bottom. These are formed in the block 12 of non-heat-conducting phenolic plastic and are adapted to receive female mold parts of heat-conducting material as will be presently explained. The lower platen 5 has four seat portions 19 formed in the upper plate 15 thereof each adapted to receive a separately formed male platen portion 20 of non-heat-conducting phenolic plastic tapered to larger dimension from top to bottom held in place by a stainless steel retaining ring 21. Each male platen portion 20 is adapted to have disposed thereover a male mold part of heat-conducting material as will be presently explained. Thus in operation the upper platen comprises the stainless-steel-sheathed block 12 of non-heat-conducting phenolic plastic with female mold parts of heat-conducting material and the lower platen comprises the stainless-steel-sheathed block 13 of non-heat-conducting phenolic plastic with male platen portions 20 of non-heat-conducting phenolic plastic and male mold parts of heat-conducting material.

Figure 9:
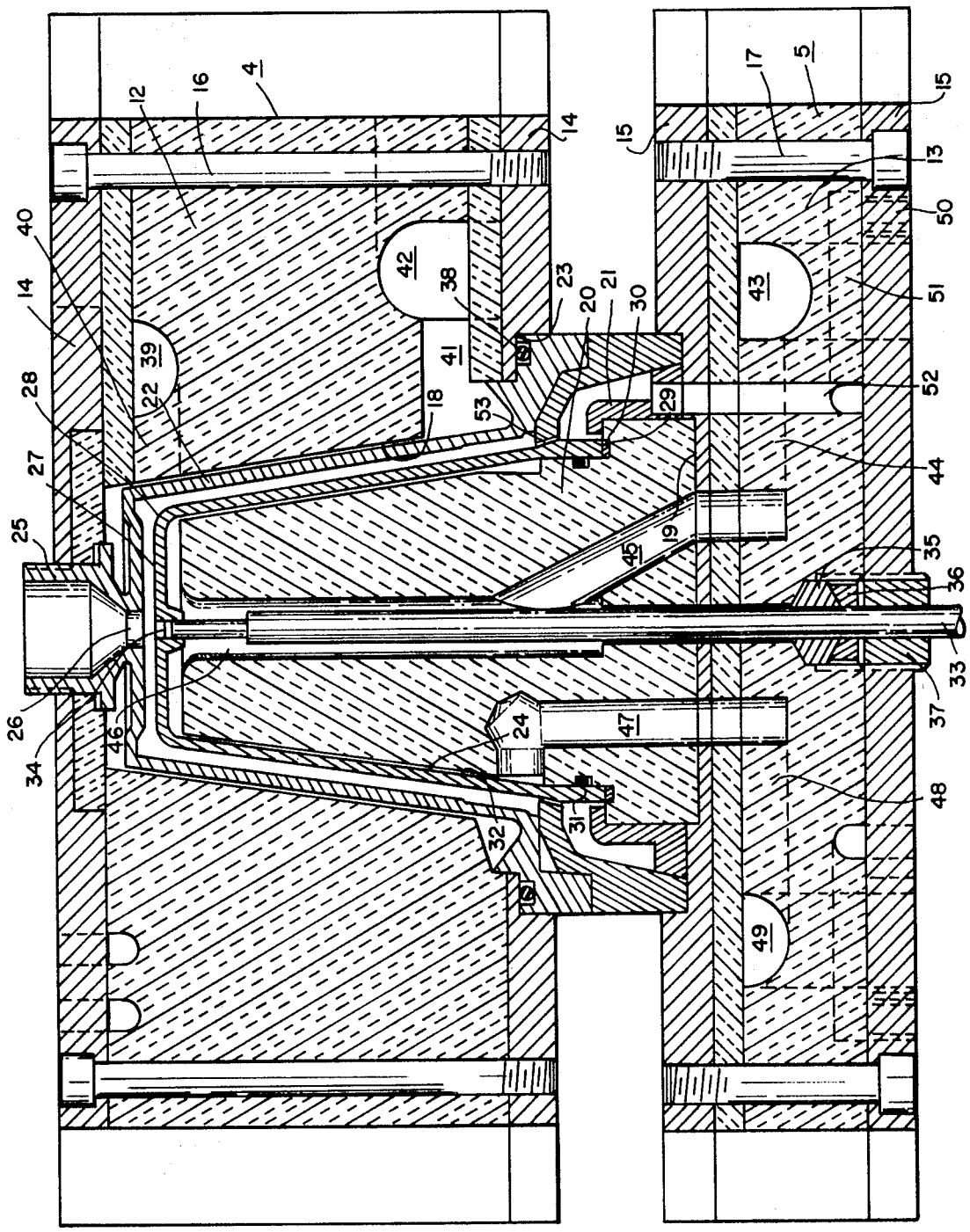
FIG. 9 is an enlarged cross-sectional view as though taken on the line IX-IX of FIG. 1 but with the lower platen raised into cooperative relationship with the upper platen and with a steam injection tube applied.

Referring now to FIG. 9 which shows one of the four identical molds in detail to enlarged scale, the female and male mold parts are formed out of brass. The female mold part is designated generally by reference numeral 22 and is seated in a seat 23 in the lower plate 14 and sealed thereto by an O-ring 38. The female mold part 22 is spaced from the wall of the cavity 18 forming between the mold part 22 and the wall of the cavity 18 a passage 24 through which media of different temperatures are adapted to pass during the molding operation as mentioned above and as will be presently further explained. The female mold part 22 is of inverted tapered cup shape but has at its upper end a centrally disposed hopperlike upward extension 25 communicating with a port 26 through the wall of the mold part 22 through which material to be molded into a cup is adapted to be fed to the mold cavity 27 formed between the female mold part 22 and the cooperating male mold part now to be described when the platens are in cooperative relationship for molding as shown in FIG. 9.

The male mold part is designated generally by reference numeral 28 and is seated on a Teflon gasket 29 on a shoulder 30 of the male platen portion 20 and sealed thereto by an O-ring 31. The male mold part 28 is spaced from the male platen portion 20 above the O-ring 31 forming between the mold part 28 and the male platen portion 20 a passage 32 through which media of different temperatures are adapted to pass during the molding operation as mentioned above and as will be presently further explained. The male mold part 28 is shaped to cooperate with the female mold part 22 to form tapered cups. A brass injection tube 33 extends up through the block 13, the plates 15 and the male platen portion 20 and communicates with a port 34 through the wall of the mold part 28. The injection tube is sealed to the block 13 by asbestos packing 35, a brass packing gland 36 and a brass packing nut 37.

As above indicated, steam and water will be taken as examples of the media of different temperatures employed in the molding operation. The material of which the cups are to be formed is introduced into the four mold cavities 27 through the ports 26. The steam and water for the passages 24 enter through a header 39 and connecting ducts 40 and are discharged through ducts 41 and a header 42 connected therewith. The steam and water for the passages 32 enter through a header 43 and connecting ducts 44, 45 and 46 and are discharged through ducts 47 and 48 and a header 49 connected therewith. All of the headers and ducts are formed in the non-heat-conducting material of the blocks 12 and 13 and the male platen portions 20.

The control mechanism for the molding apparatus may assume an infinite variety of forms. Suitable valves, valve-operating means, timers and other control instrumentalities are provided as is apparent to those skilled in the art and such devices may be assembled and related for automatic control of the molding apparatus with provision for manual control when desired. In describing a cycle of operation of the molding apparatus it will be sufficient to describe the sequence of functions, it being understood by those skilled in the art that control devices suitable for performing the functions in the sequence and timing described may be devised by any competent controls engineer.

At the beginning of a cycle the lower platen 5 is withdrawn downwardly and spaced from the upper platen 4 as shown in FIG. 1, the cups formed in the preceding cycle having been removed. Fluid is admitted below the piston in the cylinder 7 to raise the lower platen into cooperative relationship with the upper platen so that each of the four molds is constituted ready for a molding operation by the cooperatively assembled mold parts as shown in FIG. 9. At the same time as fluid is admitted below the piston in the cylinder 7 steam is admitted to the headers 39 and 43 and flows through the passages 24 and 32 and out through the headers 42 and 49, purging the passages 24 and 32 of water from the preceding cycle and preheating the molds. A plug mounted at the lower end of a vertical stem which projects up through the hopper 25 is provided for each of the four molds to maintain the port 26 closed during cup formation. The plugs are not shown in the drawings to promote clarity of disclosure of the parts which are shown. At the beginning of the cycle the plugs are in position closing the ports 26 with the lower faces of the plugs flush with the lower face of the top of the female mold part 22. After the lower platen has been assembled to and seated against the upper platen the plugs are withdrawn upwardly and material to be molded is introduced through the ports 26 into the mold cavities 27. When the mold cavities 27 are filled the plugs are moved back to their original positions closing the ports 26.

When the mold cavities 27 are filled with material to be molded into cups the headers 42 and 49 are closed to maintain a controlled steam pressure around the molds. Such controlled steam pressure is maintained for a predetermined period by a timer. When the molds have been heated to the requisite temperature steam is admitted through the injection tubes 33 and flows into the mold cavities 27 causing the material in the mold cavities to fuse and form into cups having the shape of the mold cavities. The steam admitted through the injection tubes 33 is shut off and the headers 42 and 49 are opened to drain. At the same time water is introduced through the headers 39 and 43 and passes through the passages 24 and 32 and out through the headers 42 and 49, cooling the molds and the formed material therein.

After a predetermined time the cooling water is shut off and the lower platen is withdrawn downwardly toward the position shown in FIG. 1. When the lower platen is moving toward its lowermost position and the male and female mold parts are entirely separated compressed air is introduced through passages 50, 51 and 52 and upwardly through ports 53 at the bottoms of the mold cavities to blow the formed cups upwardly off of the male mold parts 28. When the lower platen reaches its lowermost position as shown in FIG. 1 the molding apparatus is ready for commencement of the succeeding cycle.

As above explained, the provision of non-heat-conducting material inside and outside the mold minimizes heat transfer away from the mold in either direction and greatly increases the thermal efficiency of the forming procedure and as a consequence reduces the cycle time and increases the output of the apparatus. Also the self-aligning means for the lower platen insure proper cooperative relationship between the platens and the mold parts on each cycle, further contributing to the efficiency and speed of the operation.

While I have shown and described a present preferred embodiment of the invention it is to be distinctly understood that the invention is not limited thereto but may be otherwise variously embodied within the scope of the following claims.

I claim:

1. Molding apparatus for forming an article out of material subjected successively to different temperatures comprising a mold in which the material is formed, the mold being constituted of heat-conducting material, and means forming cooperatively with the mold and directly opposed to the mold a passage through which media of different temperatures are adapted successively to pass in contact with the mold so that the material in the mold is subjected successively to the temperatures of said media through the heat conducting material of the mold, said means being of non-heat-conducting material whereby to minimize heat transfer therethrough in either direction 2. Molding apparatus for forming an article out of material subjected successively to different temperatures as claimed in claim 1 in which the mold has male and female mold parts adapted for separation to permit removal of the formed article and said means form cooperatively with at least one of the mold parts a passage through which said media are adapted successively to pass in contact with such mold part or parts.

3. Molding apparatus for forming an article out of material subjected successively to different temperatures as claimed in claim 1 in which the mold has male and female mold parts adapted for separation to permit removal of the formed article and said means form cooperatively with each of the mold parts a passage through which said media are adapted successively to pass in contact with such mold part.

4. Molding apparatus for forming an article out of material subjected successively to different temperatures comprising opposed platens comprising non-heat-conducting material, means for relatively moving the platens toward and away from each other, the platens having respectively male and female portions arranged so that the male portion enters the female portion when the platens move relatively toward each other, and a male mold part of heat-conducting material disposed over and in close proximity to the male platen portion throughout the major portion of the male mold part and a female mold part of heat-conducting material disposed within and in close proximity to the female platen portion throughout the major portion of the female mold part so that when the platens move relatively toward each other the male and female mold parts form a mold for forming an article out of said material disposed in the mold with passages for said media between the male mold part and the male platen portion and between the female mold part and the female platen portion, heat transfer through the male and female platen portions being minimized due to the platens comprising non-heat-conducting material disposed in close proximity to the male and female mold parts throughout the major portion of the male and female mold parts.

5. Molding apparatus for forming an article out of material subjected successively to different temperatures as claimed in claim 4 in which guide means are provided for relatively guiding the platens in their relative movement toward and away from each other with platen-carried means cooperating with the guide means for precision guiding of the relative movement of the platens.

6. Molding apparatus for forming an article out of material subjected successively to different temperatures as claimed in claim 4 in which guide means are provided in fixed relationship with one of the platens and the other platen carries means cooperating with the guide means for precision guiding of the relative movement of the platens.

7. Molding apparatus for forming an article out of material subjected successively to different temperatures as claimed in claim 6 in which the second mentioned platen carries metal means cooperating with the guide means for precision guiding of the relative movement of the platens.

8. Molding apparatus for forming an article out of material subjected successfully to different temperatures as claimed in claim 4 in which the platens are sheathed with strong noncorrosive wear-resistant material.

9. Molding apparatus for forming an article out of material subjected successively to different temperatures as claimed in claim 8 in which the sheathing is stainless steel.

10. Molding apparatus for forming an article out of material subjected successively to different temperatures as claimed in claim 9 in which guide means and platen-carried means cooperating with the guide means are provided for precision guiding of the relative movement of the platens.

11. Molding apparatus for forming an article out of material subjected successively to different temperatures as claimed in claim 6 in which self-aligning means are provided insuring mating of the platens in proper cooperative relationship when the second mentioned platen is moved into position against the first mentioned platen.

12. Molding apparatus for forming an article out of material subjected successively to different temperatures as claimed in claim 11 in which the self-aligning means comprise a yoke pivoted to the means for relatively moving the platens and connected with the second mentioned platen.